(12) United States Patent
Soga et al.

(10) Patent No.: US 6,929,686 B2
(45) Date of Patent: Aug. 16, 2005

(54) INK COMPOSITION FOR INKJET RECORDING

(75) Inventors: Mamoru Soga, Osaka (JP); Hidekazu Arase, Hyogo (JP); Masaichiro Tatekawa, Osaka (JP); Keishi Taniguchi, Shizuoka (JP); Tsutomu Matsuda, Tokyo (JP); Masashi Ito, Shizuoka (JP); Takamichi Enomoto, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 8 days.

(21) Appl. No.: 10/454,327

(22) Filed: Jun. 4, 2003

(65) Prior Publication Data

US 2004/0031418 A1 Feb. 19, 2004

(30) Foreign Application Priority Data

Jun. 10, 2002 (JP) ........................................ 2002-168254

(51) Int. Cl.$^7$ .............................................. C09D 11/02
(52) U.S. Cl. ................ 106/31.27; 106/31.6; 106/31.58; 106/31.86; 106/31.43; 106/31.75
(58) Field of Search ........................... 106/31.27, 31.6, 106/31.58, 31.86, 31.43, 31.75

(56) References Cited

U.S. PATENT DOCUMENTS

| 5,935,311 | A | * | 8/1999 | Matsumura et al. | ...... 106/31.43 |
| 6,153,001 | A | * | 11/2000 | Suzuki et al. | ............. 106/31.65 |
| 6,197,101 | B1 | * | 3/2001 | Matsumura et al. | ... 106/287.11 |
| 6,264,730 | B1 | * | 7/2001 | Matsumura et al. | ..... 106/31.43 |
| 2003/0078320 | A1 | * | 4/2003 | Yatake | ........................ 523/160 |
| 2003/0197769 | A1 | * | 10/2003 | Soga et al. | .................. 347/100 |
| 2003/0213403 | A1 | * | 11/2003 | Soga et al. | ............. 106/31.27 |
| 2003/0221586 | A1 | * | 12/2003 | Arase et al. | ............. 106/31.27 |

FOREIGN PATENT DOCUMENTS

| JP | 10-212439 | 8/1998 |
| JP | 11-293167 | 10/1999 |
| JP | 11-315231 | 11/1999 |
| JP | 2000-178494 | 6/2000 |

* cited by examiner

*Primary Examiner*—David Sample
*Assistant Examiner*—Veronica F. Faison
(74) *Attorney, Agent, or Firm*—Harness, Dickey & Pierce, P.L.C.

(57) ABSTRACT

In an ink composition used for inkjet recording which contains a colorant, a humectant, water, and a water-soluble substance that begins to be condensation-polymerized as the water evaporates, a condensation-polymerization accelerating agent for accelerating the condensation-polymerization of the water-soluble substance is further contained.

10 Claims, 3 Drawing Sheets

INK COMPOSITION FOR INKJET RECORDING

BACKGROUND OF THE INVENTION

1. Field of the Invention

The present invention falls within the technical field that relates to an ink composition which is suitable for inkjet recording.

2. Description of the Prior Art

Conventionally, ink containing a dye, a humectant and water has been well known as ink used for inkjet recording. However, in the case of forming an image with the ink on a recording medium, the water-resistivity of the image is a matter of concern, i.e., there is a problem such that the dye exudes into water when the image is exposed to water. Especially when an image is recorded on plain paper, the water-resistivity of the image is very poor. (The "plain paper" herein refers to paper which is one of various types of commercially-available paper, which is especially used for an electrophotographic copying machine, and which is produced without an intention to have an optimum structure, composition, properties, or the like, for inkjet recording.)

In Japanese Unexamined Patent Publication No. 10-212439, Japanese Unexamined Patent Publication No. 11-293167, Japanese Unexamined Patent Publication No. 11-315231, and Japanese Unexamined Patent Publication No. 2000-178494, adding a hydrolyzable silane compound (organic silicon compound) to ink in order to improve the water-resistivity of an image formed with the ink on a recording medium has been proposed. When a drop of such ink containing a silane compound is adhered on a recording medium, and a water content (solvent) of the ink drop evaporates or permeates into the recording medium, the silane compound remaining on the recording medium is condensation-polymerized, and this condensation-polymerized silane compound encloses a dye. As a result, even when the image formed on the recording medium is exposed to water, the dye is prevented from exuding into the water.

However, it was found that an actual image recorded on a recording medium with any of the ink compositions proposed in the above conventional examples did not necessarily exhibit sufficient water-resistivity. That is, when the recorded image is soaked in water, the dye is dissolved in water or a bleeding occurs in the image because of water in some cases.

Furthermore, it was found that in the ink compositions containing some types of colorants, an effect of an aminosilane compound was not obtained, and therefore, the water-resistivity was hardly obtained. This is especially the case when a magenta dye is contained in the ink composition.

SUMMARY OF THE INVENTION

After various examinations, the present inventors found that an image formed with an ink composition of the conventional example has insufficient water-resistivity because condensation-polymerization of an aminosilane compound is not completed. Before the condensation-polymerization of the aminosilane compound is completed, a product of the condensation-polymerization cannot sufficiently enclose a colorant. As a result, when the image comes into contact with water, a colorant which is not enclosed by a condensation-polymerization product of aminosilane exudes into water, and accordingly, a bleeding occurs in the recorded image.

The present invention was conceived in view of the above problems. An objective of the present invention is to greatly improve the water-resistivity of an image formed with an ink composition containing a water-soluble substance that is condensation-polymerized in the absence of water, such as the above-described aminosilane compound, by completing condensation-polymerization of the water-soluble substance.

The ink composition of the present invention is an ink composition containing a colorant, a humectant, water, and a water-soluble substance that begins to be condensation-polymerized as the water evaporates.

This ink composition further contains a condensation-polymerization accelerating agent for accelerating condensation-polymerization of the water-soluble substance.

According to this structure, when the ink composition is adhered onto a recording medium (e.g., paper), the water-soluble substance is condensation-polymerized, and a product of the condensation-polymerization encloses the colorant. At this time, condensation-polymerization of the water-soluble substance is quickly carried out because of an effect of the condensation-polymerization accelerating agent contained in the ink composition. Thus, the condensation-polymerization of the water-soluble substance is completed, and a product of the condensation-polymerization surely encloses the colorant (dye or pigment). As a result, even when the image formed on the recording medium is exposed to water immediately after the formation thereof, the colorant does not exudes into the water because the colorant is enclosed by the condensation-polymerized water-soluble substance. Thus, the water-resistivity of the image is greatly improved.

A preferable example of the water-soluble substance contained in the ink composition is a hydrolyzable silane compound because it has a strong interaction with a colorant. Preferably, the water-soluble substance further contains aminosilane.

The condensation-polymerization accelerating agent is preferably an inorganic or organic ammonium salt. Herein, examples of the ammonium salt include an ammonium ion ($NH_4^+$) and an ammonium ion whose hydrogen atoms are substituted with various substituents R (R: alkyl, aryl, etc.). The ammonium salt is dissociated on the recording medium to release ammonium or amine, so that a remaining inorganic acid or organic acid accelerates the condensation-polymerization of the water-soluble substance.

The ammonium salt is preferably a weak-acid ammonium salt. After ammonium salts of various acidities were examined, it was found that the weak-acid ammonium salt has a great water-resistivity improving effect.

The ammonium salt is preferably a strong-acid ammonium salt. After ammonium salts of various acidities were examined, it was found that the strong-acid ammonium salt has a great effect of stably decreasing the pH of the ink composition.

Preferably, the ink composition further contains a penetrant. In such a case, after the ink is adhered onto a recording medium (e.g., paper), the solvent of the ink which includes the humectant, the penetrant and water quickly permeates into the recording medium. Accordingly, the condensation-polymerization of the water-soluble substance is quickly carried out so that the colorant is securely enclosed by the condensation-polymerized water-soluble substance. As a result, the water-resistivity of the image is further improved.

DESCRIPTION OF THE PREFERRED EMBODIMENTS

Structure of Recording Apparatus

Figure 1:
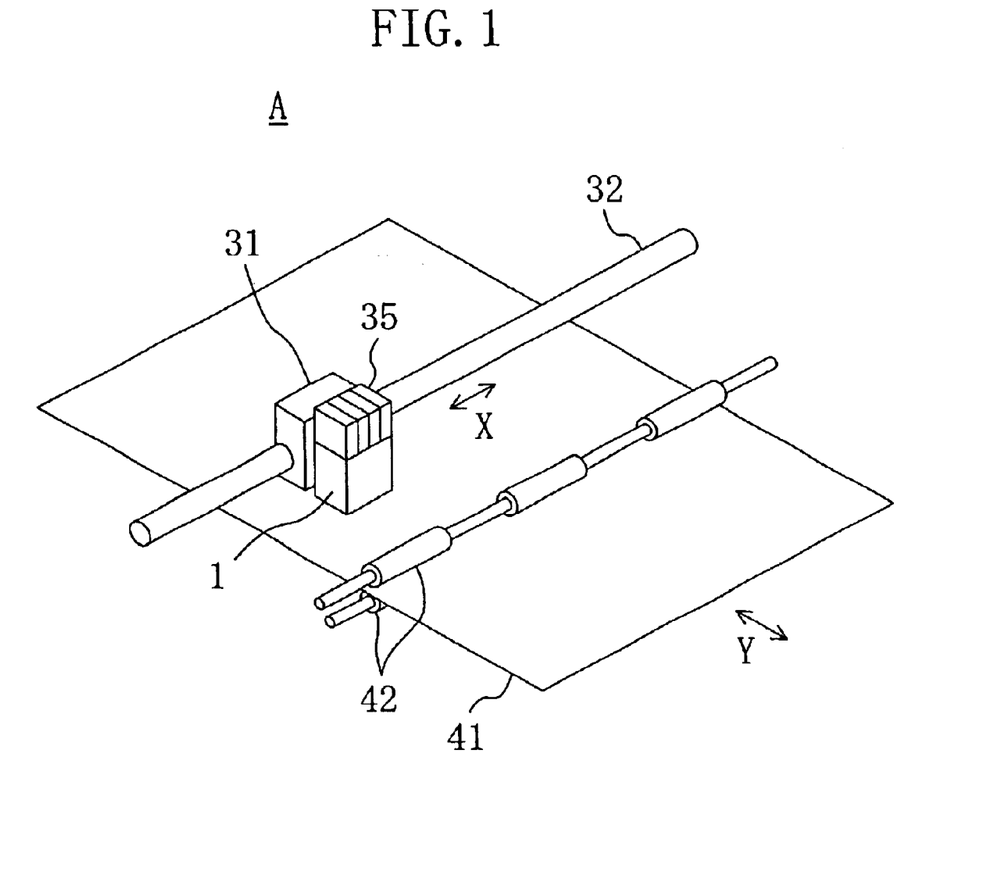
FIG. 1 is a general perspective view showing an inkjet-type recording apparatus according to an embodiment of the present invention.

FIG. 1 generally shows an inkjet-type recording apparatus A including an ink composition for inkjet recording according to an embodiment of the present invention. The recording apparatus A has an inkjet head 1. The inkjet head 1 ejects the ink onto recording paper 41 in a manner described later. On the upper surface of the inkjet head 1, an ink cartridge 35 including the ink is attached.

The inkjet head 1 is fixedly supported by a carriage 31. The carriage 31 is provided with a carriage motor (not shown). The inkjet head 1 and the carriage 31 are reciprocated by the carriage motor along a major scanning direction (X direction in FIGS. 1 and 2) while being guided by a carriage shaft 32 that extends along the major scanning direction.

The recording paper 41 is sandwiched by two transfer rollers 42 which are rotated by a transfer motor (not shown). Under the inkjet head 1, the recording paper 41 is transferred by the transfer motor and transfer rollers 42 along the minor scanning direction which is perpendicular to the major scanning direction (Y direction in FIGS. 1 and 2).

As described above, the recording apparatus A is structured such that the inkjet head 1 and the recording paper 41 are relatively moved with respect to each other by the carriage 31, the carriage shaft 32 and the carriage motor, and the transfer rollers 42 and the transfer motor.

Figure 2:
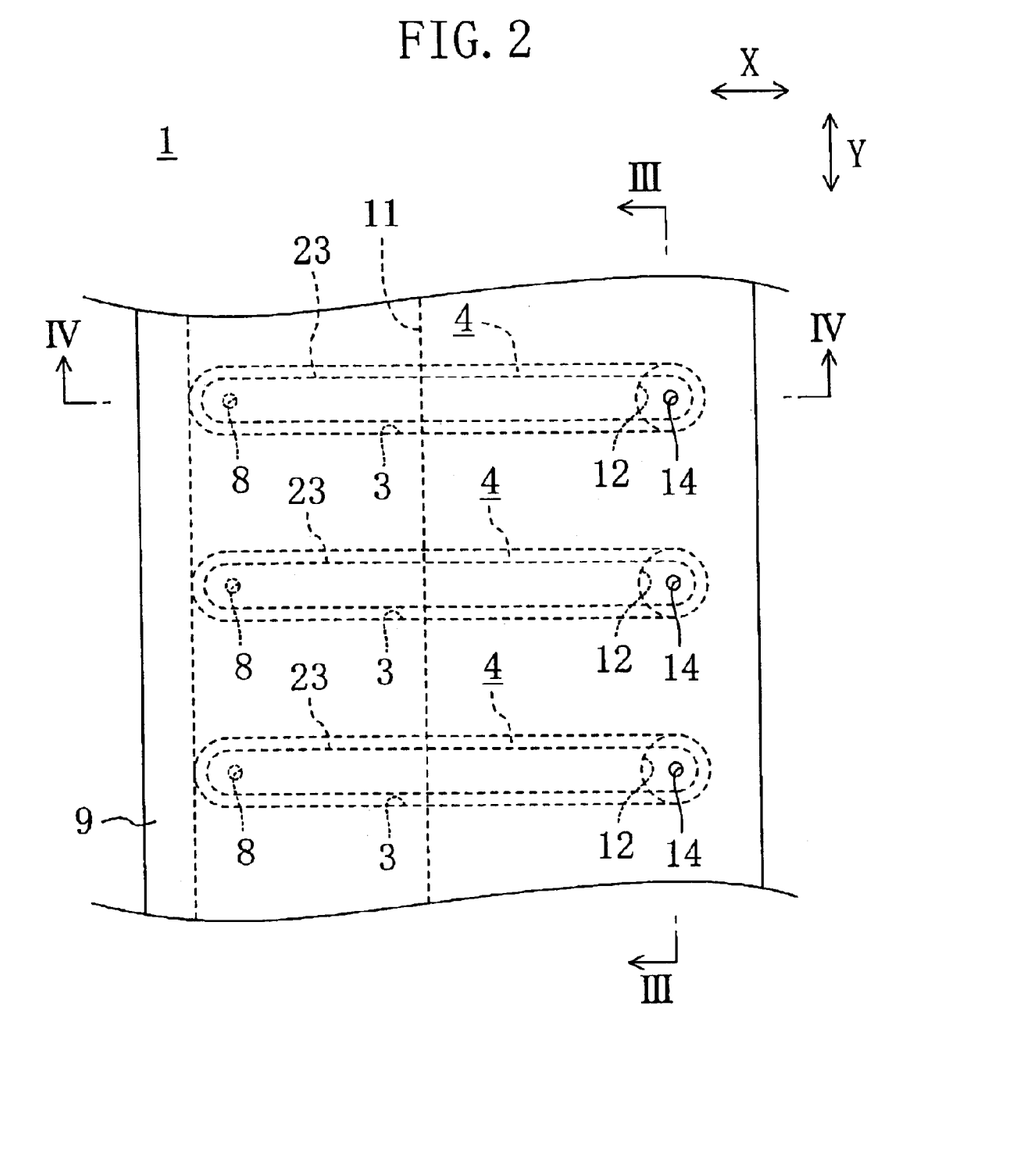
FIG. 2 shows a portion of a bottom surface of an inkjet head of the inkjet-type recording apparatus.
Figure 3:
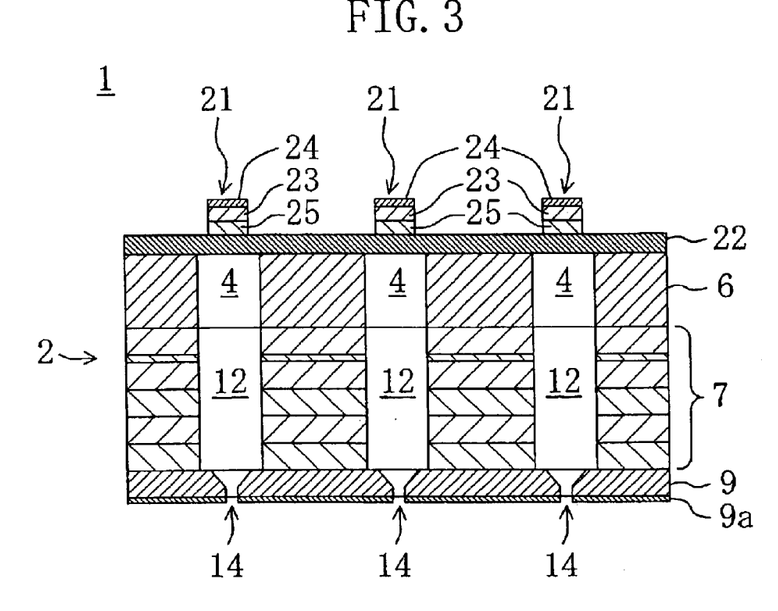
FIG. 3 is a cross-sectional view taken along line III—III of FIG. 2.
Figure 4:
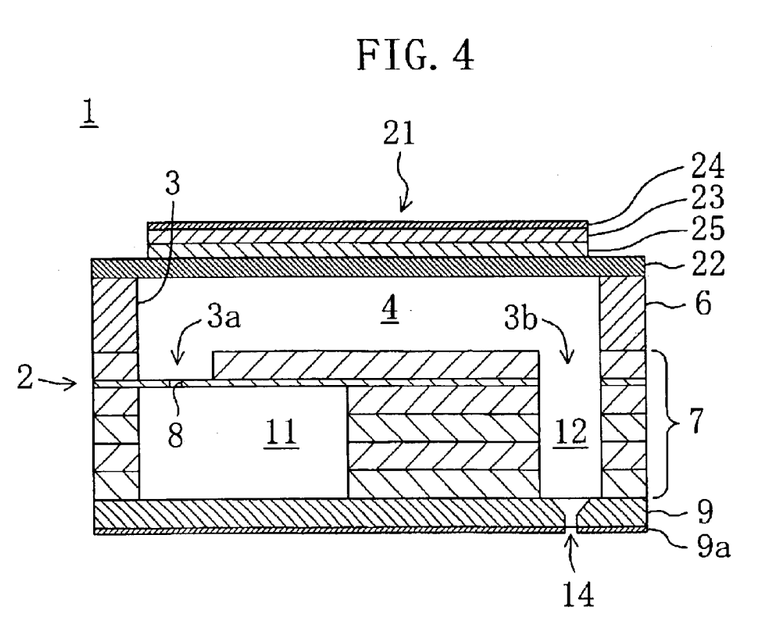
FIG. 4 is a cross-sectional view taken along line IV—IV of FIG. 2.

Referring to FIGS. 2 through 4, the inkjet head 1 includes a head main body 2. The head main body 2 has a plurality of concaved portions 3 for pressure rooms. Each of the concaved portions 3 of the head main body 2 has a supply hole 3a for supplying ink and an ejection hole 3b for ejecting the ink. The concaved portions 3a are opened in the upper surface of the head main body 2 such that the openings extend along the major scanning direction, and arranged along the minor scanning direction with generally-equal intervals therebetween. The length of the opening of each concaved portion 3 is set to about 1250 μm, and the width thereof is set to about 130 μm. Opposite ends of the opening of each concaved portion 3 have a generally-semicircular shape.

A side wall of each concaved portion 3 is formed by a pressure room member 6 made of photosensitive glass having a thickness of about 200 μm. A bottom wall of each concaved portion 3 is formed by an ink passage member 7 which is adhesively fixed onto the lower surface of the pressure room member 6. The ink passage member 7 is a laminate of six thin plates of stainless steel. The ink passage member 7 has a plurality of orifices 8, one ink supply passage 11, and a plurality of ink ejection passages 12. Each of the orifices 8 is connected to the supply hole 3a of a corresponding one of the concaved portions 3. The ink supply passage 11 extends along the minor scanning direction and is connected to the orifices 8. Each of the ink ejection passages 12 is connected to the ejection hole 3b of a corresponding one of the concaved portions 3.

Each orifice 8 is formed in the thin stainless steel plate which is the second from the top of the ink passage member 7, and whose thickness is smaller than the others. The diameter of the orifice 8 is set to about 38 μm. The ink supply passage 11 is connected to the ink cartridge 35, such that the ink is supplied from the ink cartridge 35 into the ink supply passage 11.

A nozzle plate 9 made of stainless steel is adhesively fixed onto the lower surface of the ink passage member 7. The nozzle plate 9 has a plurality of nozzles 14 for ejecting ink drops toward the recording paper 41. The lower surface of the nozzle plate 9 is covered with a water-repulsive film 9a. The nozzles 14 are aligned in a row on the lower surface of the inkjet head 1 along the minor scanning direction. The nozzles 14 are connected to the ink ejection passages 12 so as to have a communication with the ejection holes 3b of the concaved portions 3 through the ink ejection passages 12. Each nozzle 14 includes a tapered portion, where the nozzle diameter gradually decreases along a direction toward a nozzle tip side, and a straight portion provided at the nozzle tip side of the tapered portion. The nozzle diameter of the straight portion is set to about 20 μm.

Piezoelectric actuators 21 are provided above the concaved portions 3 of the head main body 2. Each of the piezoelectric actuators 21 has a diaphragm 22 made of Cr. The diaphragm 22 is adhesively fixed onto the upper surface of the head main body 2 so as to cover the concaved portions 3 of the head main body 2, such that the diaphragm 22 and the concaved portions 3 form pressure rooms 4. The diaphragm 22 is made of a single plate which is commonly used for all of the actuators 21. The diaphragm 22 also functions as a common electrode which is commonly used for all of piezoelectric elements 23 (described later).

Each piezoelectric actuator 21 has a piezoelectric element 23 made of lead zirconate titanate (PZT) and an individual electrode 24 made of Pt. On a surface of the diaphragm 22 which is opposite to the pressure room 4 (i.e., the upper surface of the diaphragm 22), an intermediate layer 25 made of Cu is provided at a portion of the surface which corresponds to the pressure room 4 (a portion above the opening of the concaved portion 3), and the piezoelectric element 23 is provided on the intermediate layer 25. The individual electrode 24 is bonded onto a surface of the piezoelectric element 23 which is opposite to the diaphragm 22 (i.e., the upper surface of the piezoelectric element 23). Each individual electrode 24 functions together with the diaphragm 22 to apply a voltage (driving voltage) to a corresponding one of the piezoelectric elements 23.

All of the diaphragm 22, the piezoelectric elements 23, the individual electrodes 24 and the intermediate layers 25 are formed of thin films. The thickness of the diaphragm 22 is set to about 6 μm. The thickness of each piezoelectric element 23 is set to 8 μm or smaller (e.g., about 3 μm). The thickness of each individual electrode 24 is set to about 0.2 μm. The thickness of each intermediate layer 25 is set to about 3 μm.

Each piezoelectric actuator 21 applies a driving voltage to the piezoelectric element 23 through the diaphragm 22 and the individual electrode 24, thereby deforming a portion of the diaphragm 22 which corresponds to the pressure room 4 (a portion of the diaphragm 22 at the opening of the concaved portion 3). As a result of the deformation of the diaphragm 22, the ink in the pressure room 4 is ejected from the nozzle 14 through the ejection hole 3b. That is, when a pulse-shaped voltage is applied between the diaphragm 22 and the individual electrode 24, the piezoelectric element 23 shrinks in the width direction of the piezoelectric element 23, which is perpendicular to the thickness direction thereof, in response to a rising edge of the pulse voltage because of a piezoelectric effect. On the other hand, the diaphragm 22, the individual electrode 24 and the intermediate layer 25 do not shrink even when the pulse voltage is applied. As a result, a portion of the diaphragm 22 which corresponds to the pressure room 4 is flexibly deformed into the shape of a convex toward the pressure room 4 because of a so-called bimetal effect. This flexible deformation increases the pressure inside the pressure room 4, and because of this increased pressure, the ink in the pressure room 4 is squeezed out of the nozzle 14 through the ejection hole 3$b$ and the ink ejection passages 12. Then, the piezoelectric element 23 expands in response to a falling edge of the pulse voltage so that the portion of the diaphragm 22 which corresponds to the pressure room 4 recovers its original shape. At this time, the ink squeezed out of the nozzle 14 is separated from the ink remaining in the ink ejection passage 12, whereby the separated ink is released as an ink drop (e.g., 3 pl) toward the recording paper 41. The released ink drop adheres onto the recording paper 41 in the form of a dot. On the other hand, when the diaphragm 22 flexibly deformed in the shape of a convex recovers its original shape, the pressure room 4 is charged with ink supplied from the ink cartridge 35 through the ink supply passage 11 and the supply hole 3$a$. The pulse voltage applied to the piezoelectric elements 23 is not limited to the voltage of push-up/pull-down type as described above, but may be a voltage of pull-down/push-up type which falls from the first voltage to the second voltage that is lower than the first voltage and then rises to the first voltage.

The application of the driving voltage to each piezoelectric element 23 is performed at a predetermined time interval (for example, about 50 $\mu$m: driving frequency=20 kHz) while the inkjet head 1 and the carriage 31 are moved from one edge to the other edge of the recording paper 41 at a generally uniform speed along the major scanning direction. It should be noted, however, that the voltage is not applied when the inkjet head 1 resides above a portion of the recording paper 41 where an ink drop is not to be placed. In this way, an ink drop is placed at a predetermined position. After recording of one scanning cycle completes, the recording paper 41 is transferred by a predetermined distance along the minor scanning direction by the transfer motor and the transfer rollers 42. Then, ink drops are ejected again while the inkjet head 1 and the carriage 31 are moved along the major scanning direction, whereby recording of another one scanning cycle is performed. This operation is repeated until a desired image is formed over the recording paper 41.

Ink Composition

An ink composition used in the recording apparatus A contains a colorant (dye or pigment), a humectant for suppressing drying of the ink in the nozzle 14 of the inkjet head 1, or the like, water, and a hydrolyzable silane compound employed as a water-soluble substance that begins to be condensation-polymerized as the water evaporates (a water-soluble substance that is condensation-polymerized in the absence of the water).

When an ink drop ejected from the nozzle 14 of the inkjet head 1 is adhered onto the recording paper 41, and the water content (solvent) evaporates or permeates into the recording paper 41, the hydrolyzable silane compound is condensation-polymerized on the recording paper 41 to enclose the colorant. Because of this mechanism, even when an image formed with this ink composition on the recording paper 41 is exposed to water, the colorant is prevented from exuding into the water, and as a result, the water-resistivity of the image is improved.

A preferable hydrolyzable silane compound is a reaction product of hydrolysis of alkoxysilane containing an organic group that has an amino group and alkoxysilane not containing an amino group. Another preferable hydrolyzable silane compound is an organic silicon compound obtained by hydrolysis of a hydrolyzable silane that is produced by reacting an organic monoepoxy compound with a hydrolyzable silane having an amino group and a hydrolyzable silane not containing a nitrogen atom.

The dye may be any type of dye but is preferably a water-soluble acid dye or direct dye.

Preferable pigments are shown below. For example, preferable black pigments include carbon black whose surface is treated with a diazonium salt and carbon black whose surface is treated by graft polymerization of a polymer.

Preferable color pigments include a pigment treated with a surface active agent, such as a formalin condensation product of naphthalene-sulfonate, lignin sulfonic acid, dioctylsulfosuccinate, polyoxyethylene alkylamine, aliphatic acid ester, or the like. Specifically, examples of preferable cyan pigments include Pigment Blue 15:3, Pigment Blue 15:4, and aluminum phthalocyanine. Examples of preferable magenta pigments include Pigment Red 122 and Pigment Violet 19. Examples of preferable yellow pigments include Pigment Yellow 74, Pigment Yellow 109, Pigment Yellow 110, and Pigment Yellow 128.

The humectant is desirably a polyhydric alcohol, such as diethylene glycol, glycerol, or the like, or a water-soluble nitrogen heterocyclic compound, such as 2-pyrrolidone or N-methyl-2-pyrrolidone.

The ink composition of this embodiment further contains a condensation-polymerization accelerating agent.

The condensation-polymerization accelerating agent is desirably an organic or inorganic ammonium salt. Herein, the ammonium salt includes an ammonium ion ($NH_4^+$) and an ammonium ion whose hydrogen atoms are substituted with various substituents R (R: alkyl, aryl, etc.).

Among various ammonium salts, a weak-acid ammonium salt has a great water-resistivity improving effect.

A strong-acid ammonium salt is readily dissociated to release an hydrogen ion and therefore has a great effect of decreasing the pH of the ink composition.

Specific examples of the inorganic, strong-acid ammonium salt include ammonium chloride, ammonium sulfate, ammonium hydrogensulfate, ammonium sulfite, ammonium thiosulfate, ammonium nitrate, ammonium bromide, ammonium fluoride, and ammonium iodide.

Specific examples of the inorganic, weak-acid ammonium salt include monoammonium dihydrogen phosphate, diammonium hydrogen phosphate, triammonium phosphate, ammonium hypophosphite, ammonium carbonate, ammonium bicarbonate, ammonium sulfide, ammonium borate, and ammonium borofluoride.

Specific examples of the organic, strong-acid ammonium salt include ammonium formate, ammonium monofluoroacetate, ammonium trifluoroacetate, ammonium monochloroacetate, and ammonium trichloroacetate.

Specific examples of the organic, weak-acid ammonium salt include ammonium acetate, diammonium oxalate, ammonium hydrogen oxalate, ammonium benzoate, monoammonium citrate, diammonium citrate, triammonium citrate, ammonium lactate, ammonium phthalate, ammonium succinate, monoammonium tartrate, and diammonium tartrate.

Desirably, the ink composition further contains a penetrant for enhancing the permeability of the ink into the recording paper 41. The penetrant is preferably monoalkylether of polyhydric alcohol, such as diethyleneglycol monobutylether, or the like. The content of the penetrant is preferably 1–50% by mass with respect to the total amount of the ink. This is because if the content of the penetrant is smaller than 1%, the surface tension of the ink at 25° C. cannot be 50 mN/m or smaller, and as a result, an effect of allowing the ink to permeate into the recording paper 41 is not sufficiently obtained. On the other hand, if the content of the penetrant is greater than 50%, the solubility of the colorant and silane compound into water decreases.

In the case where the ink composition contains a penetrant, it is desirable to set the surface tension of the ink composition at 25° C. to 20–50 mN/m by adjusting the content of the penetrant. This is because if the surface tension is smaller than 20 mN/m, it becomes difficult to form the ink composition into the shape of a droplet when it is ejected from the nozzle 14. If the surface tension is greater than 50 mN/m, the ink composition does not readily permeates into the recording paper 41. In some cases, the surface tension of about 20 mN/m cannot be realized only by adding a penetrant. In such cases, a fluorine surface active agent may be added to the ink composition as an assisting agent for the penetrant. The fluorine surface active agent is preferably an ammonium salt of perfluoro alkylsulfon acid, a potassium salt of perfluoro alkylsulfon acid, or a potassium salt of perfluoro alkylcarbon acid.

The ink composition of this embodiment contains a colorant, a humectant, water, and a water-soluble substance that is condensation-polymerized as the water evaporates. Thus, when an ink drop of the ink composition is adhered onto the recording paper 41, the water contained in the ink drop evaporates or permeates into the recording paper 41, whereby the water-soluble substance begins to be condensation-polymerized so as to enclose the colorant. That is, the water-resistivity of an image is improved by adding the water-soluble substance to the ink composition. However, the condensation-polymerization of the water-soluble substance is not effective for all colorants. The effectiveness of such a condensation-polymerization reaction depends on the type of a colorant contained in the ink composition. Especially when the colorant is a dye, the water-resistivity of the ink composition varies according to the type of the dye. This is especially the case when a magenta dye is contained in the ink composition. With some types of dyes, the water-resistivity of the image is hardly improved even though the ink composition contains the water-soluble substance.

However, the ink composition of this embodiment further contains a condensation-polymerization accelerating agent. When an ink drop is adhered onto the recording paper 41, and a solvent which includes a humectant and water permeates into the recording paper 41, the colorant, the silane compound, and the condensation-polymerization accelerating agent remain on the recording paper 41. On the recording paper 41, the condensation-polymerization accelerating agent is dissociated or decomposed to generate an acid. Due to a function of the generated acid, the silane compound is quickly condensation-polymerized and this condensation-polymerization reaction is quickly completed. As a result, the colorant is enclosed by the condensation-polymerized silane compound in a quick and secure fashion. In this way, the water-resistivity of the image is greatly improved without depending on the type of the dye contained. Furthermore, high-level water-resistivity is obtained even immediately after the formation of the image.

The ink composition of the embodiment described above contains a hydrolyzable silane compound as the water-soluble substance that begins to be condensation-polymerized as the water evaporates, but the water-soluble substance is not limited thereto. According to the present invention, any type of water-soluble substance may be used so long as the substance is condensation-polymerized to enclose a colorant of ink when an ink drop ejected from the nozzle 14 of the inkjet head 1 is adhered on the recording paper 41, and the water content (solvent) of the ink drop evaporates or permeates into the recording paper 41.

Next, specific examples of this embodiment are described below.

First, 66 types of ink compositions for inkjet recording, which have the compositions shown below, were prepared (Examples 1–66). (It should be noted that the contents of the constituents of each composition are shown in percentage by mass.)

All of the ink compositions of Examples 1–66 contain glycerol as a humectant. All of the ink compositions of Examples 1–66 contain an organic silicon compound as the water-soluble substance that is condensation-polymerized as water evaporates. In Examples 1–66, two types of organic silicon compounds were employed. The ink compositions of Examples 1–18, 26–51 and 59–66 contain organic silicon compound (A). The ink compositions of Examples 19–25 and 52–58 contain organic silicon compound (B).

The organic silicon compound (A) was prepared by the following method. First, 180 g (10 mol) of water was poured into a reactor. A mixture of 100 g (0.56 mol) of $H_2NCH_2CH_2CH_2Si(OCH_3)_3$ and 166 g (1.1 mol) of $Si(OCH_3)_4$ was then added to the water in a drop-by-drop fashion at room temperature. After all of the mixture was dropped into the water, a resultant solution was stirred at 60° C. for one hour, whereby organic silicon compound (A) was obtained.

The organic silicon compound (B) was prepared by the following method. First, 100 g (0.56 mol) of $H_2NCH_2CH_2CH_2Si(OCH_3)_3$ was provided into a reactor. Then, 49 g (0.66 mol) of 2,3-epoxy-1-propanol was added into the reactor in a drop-by-drop fashion. After all of 2,3-epoxy-1-propanol was dropped into the reactor, a resultant mixture in the reactor was stirred at 80° C. for 5 hours, whereby an amino group and an epoxy group were reacted to produce hydrolyzable silane (B-1). Thereafter, a mixture of 120 g (6.67 mol) of water, 50.6 g (0.2 mol) of hydrolyzable silane (B-1), and 30.4 g (0.2 mol) of $Si(OCH_3)_4$ was added into another reactor in a drop-by-drop fashion. After all of the mixture was dropped into the reactor, the mixture was subjected to a reaction at 60° C. for one hour, whereby organic silicon compound (B) was obtained.

Each of the ink compositions of Examples 1–28 and 34–61 contains a dye. Each of the ink compositions of Examples 29–33 and 62–66 contains a pigment. The dye contained in the ink composition is C.I. Acid Red 289 except for Examples 26–28 and 59–61. In Examples 26–28 and 59–61, dyes having colors different from C.I. Acid Red 289 were used.

EXAMPLE 1

The ink composition of Example 1 contains ammonium chloride as the condensation-polymerization accelerating agent.

| | |
|---|---|
| C.I. Acid Red 289 | 5% |
| glycerol | 7% |
| diethyleneglycol | 5% |
| organic silicon compound (A) | 5% |
| ammonium chloride | 5% |
| pure water | 73% |

EXAMPLE 2

The ink composition of Example 2 contains ammonium nitrate as the condensation-polymerization accelerating agent.

| | |
|---|---|
| C.I. Acid Red 289 | 5% |
| glycerol | 7% |
| diethyleneglycol | 5% |
| organic silicon compound (A) | 5% |
| ammonium nitrate | 5% |
| pure water | 73% |

EXAMPLE 3

The ink composition of Example 3 contains ammonium sulfate as the condensation-polymerization accelerating agent.

| | |
|---|---|
| C.I. Acid Red 289 | 5% |
| glycerol | 7% |
| diethyleneglycol | 5% |
| organic silicon compound (A) | 5% |
| ammonium sulfate | 5% |
| pure water | 73% |

EXAMPLE 4

The ink composition of Example 4 contains ammonium bromide as the condensation-polymerization accelerating agent.

| | |
|---|---|
| C.I. Acid Red 289 | 5% |
| glycerol | 7% |
| diethyleneglycol | 5% |
| organic silicon compound (A) | 5% |
| ammonium bromide | 5% |
| pure water | 73% |

EXAMPLE 5

The ink composition of Example 5 contains diammonium hydrogen phosphate as the condensation-polymerization accelerating agent.

| | |
|---|---|
| C.I. Acid Red 289 | 5% |
| glycerol | 7% |
| diethyleneglycol | 5% |
| organic silicon compound (A) | 5% |
| diammonium hydrogen phosphate | 5% |
| pure water | 73% |

EXAMPLE 6

The ink composition of Example 6 contains ammonium carbonate as the condensation-polymerization accelerating agent.

| | |
|---|---|
| C.I. Acid Red 289 | 5% |
| glycerol | 7% |
| diethyleneglycol | 5% |
| organic silicon compound (A) | 5% |
| ammonium carbonate | 5% |
| pure water | 73% |

EXAMPLE 7

The ink composition of Example 7 contains ammonium bicarbonate as the condensation-polymerization accelerating agent.

| | |
|---|---|
| C.I. Acid Red 289 | 5% |
| glycerol | 7% |
| diethyleneglycol | 5% |
| organic silicon compound (A) | 5% |
| ammonium bicarbonate | 5% |
| pure water | 73% |

EXAMPLE 8

The ink composition of Example 8 contains ammonium borate as the condensation-polymerization accelerating agent.

| | |
|---|---|
| C.I. Acid Red 289 | 5% |
| glycerol | 7% |
| diethyleneglycol | 5% |
| organic silicon compound (A) | 5% |
| ammonium borate | 5% |
| pure water | 73% |

EXAMPLE 9

The ink composition of Example 9 contains ammonium formate as the condensation-polymerization accelerating agent.

| | |
|---|---|
| C.I. Acid Red 289 | 5% |
| glycerol | 7% |
| diethyleneglycol | 5% |
| organic silicon compound (A) | 5% |
| ammonium formate | 5% |
| pure water | 73% |

EXAMPLE 10

The ink composition of Example 10 contains ammonium trifluoroacetate as the condensation-polymerization accelerating agent.

| | |
|---|---|
| C.I. Acid Red 289 | 5% |
| glycerol | 7% |
| diethyleneglycol | 5% |
| organic silicon compound (A) | 5% |
| ammonium trifluoroacetate | 5% |
| pure water | 73% |

EXAMPLE 11

The ink composition of Example 11 contains ammonium monochloroacetate as the condensation-polymerization accelerating agent.

| | |
|---|---|
| C.I. Acid Red 289 | 5% |
| glycerol | 7% |
| diethyleneglycol | 5% |
| organic silicon compound (A) | 5% |
| ammonium monochloroacetate | 5% |
| pure water | 73% |

EXAMPLE 12

The ink composition of Example 12 contains ammonium trichloroacetate as the condensation-polymerization accelerating agent.

| | |
|---|---|
| C.I. Acid Red 289 | 5% |
| glycerol | 7% |
| diethyleneglycol | 5% |
| organic silicon compound (A) | 5% |
| ammonium trichloroacetate | 5% |
| pure water | 73% |

EXAMPLE 13

The ink composition of Example 13 contains ammonium acetate as the condensation-polymerization accelerating agent.

| | |
|---|---|
| C.I. Acid Red 289 | 5% |
| glycerol | 7% |
| diethyleneglycol | 5% |
| organic silicon compound (A) | 5% |
| ammonium acetate | 5% |
| pure water | 73% |

EXAMPLE 14

The ink composition of Example 14 contains diammonium oxalate as the condensation-polymerization accelerating agent.

| | |
|---|---|
| C.I. Acid Red 289 | 5% |
| glycerol | 7% |
| diethyleneglycol | 5% |
| organic silicon compound (A) | 5% |
| diammonium oxalate | 5% |
| pure water | 73% |

EXAMPLE 15

The ink composition of Example 15 contains diammonium citrate as the condensation-polymerization accelerating agent.

| | |
|---|---|
| C.I. Acid Red 289 | 5% |
| glycerol | 7% |
| diethyleneglycol | 5% |
| organic silicon compound (A) | 5% |
| diammonium citrate | 5% |
| pure water | 73% |

EXAMPLE 16

The ink composition of Example 16 contains diammonium tartrate as the condensation-polymerization accelerating agent.

| | |
|---|---|
| C.I. Acid Red 289 | 5% |
| glycerol | 7% |
| diethyleneglycol | 5% |
| organic silicon compound (A) | 5% |
| diammonium tartrate | 5% |
| pure water | 73% |

EXAMPLE 17

The ink composition of Example 17 contains ammonium acetate and diammonium hydrogen phosphate as the condensation-polymerization accelerating agent.

| | |
|---|---|
| C.I. Acid Red 289 | 5% |
| glycerol | 7% |
| diethyleneglycol | 5% |
| organic silicon compound (A) | 5% |
| ammonium acetate | 2.5% |
| diammonium hydrogen phosphate | 2.5% |
| pure water | 73% |

EXAMPLE 18

The ink composition of Example 18 contains ammonium acetate and ammonium nitrate as the condensation-polymerization accelerating agent.

| | |
|---|---|
| C.I. Acid Red 289 | 5% |
| glycerol | 7% |
| diethyleneglycol | 5% |
| organic silicon compound (A) | 5% |
| ammonium acetate | 2.5% |
| ammonium nitrate | 2.5% |
| pure water | 73% |

EXAMPLE 19

The ink composition of Example 19 is the same as the ink composition of Example 5 except that a different organic silicon compound is employed.

| | |
|---|---|
| C.I. Acid Red 289 | 5% |
| glycerol | 7% |
| diethyleneglycol | 5% |
| organic silicon compound (B) | 5% |
| diammonium hydrogen phosphate | 5% |
| pure water | 73% |

EXAMPLE 20

The ink composition of Example 20 is the same as the ink composition of Example 13 except that a different organic silicon compound is employed.

| | |
|---|---|
| C.I. Acid Red 289 | 5% |
| glycerol | 7% |
| diethyleneglycol | 5% |
| organic silicon compound (B) | 5% |
| ammonium acetate | 5% |
| pure water | 73% |

EXAMPLE 21

The ink composition of Example 21 is the same as the ink composition of Example 19 except that the content of the condensation-polymerization accelerating agent is different.

| | |
|---|---|
| C.I. Acid Red 289 | 5% |
| glycerol | 7% |
| diethyleneglycol | 5% |
| organic silicon compound (B) | 5% |
| diammonium hydrogen phosphate | 0.1% |
| pure water | 77.9% |

EXAMPLE 22

The ink composition of Example 22 is the same as the ink composition of Example 19 except that the content of the condensation-polymerization accelerating agent is different.

| | |
|---|---|
| C.I. Acid Red 289 | 5% |
| glycerol | 7% |
| diethyleneglycol | 5% |
| organic silicon compound (B) | 5% |
| diammonium hydrogen phosphate | 0.5% |
| pure water | 77.5% |

EXAMPLE 23

The ink composition of Example 23 is the same as the ink composition of Example 19 except that the content of the condensation-polymerization accelerating agent is different.

| | |
|---|---|
| C.I. Acid Red 289 | 5% |
| glycerol | 7% |
| diethyleneglycol | 5% |
| organic silicon compound (B) | 5% |
| diammonium hydrogen phosphate | 1% |
| pure water | 77% |

EXAMPLE 24

The ink composition of Example 24 is the same as the ink composition of Example 19 except that the content of the condensation-polymerization accelerating agent is different.

| | |
|---|---|
| C.I. Acid Red 289 | 5% |
| glycerol | 7% |
| diethyleneglycol | 5% |
| organic silicon compound (B) | 5% |
| diammonium hydrogen phosphate | 2% |
| pure water | 76% |

EXAMPLE 25

The ink composition of Example 25 is the same as the ink composition of Example 19 except that the content of the condensation-polymerization accelerating agent is different.

| | |
|---|---|
| C.I. Acid Red 289 | 5% |
| glycerol | 7% |
| diethyleneglycol | 5% |
| organic silicon compound (B) | 5% |
| diammonium hydrogen phosphate | 10% |
| pure water | 68% |

EXAMPLE 26

The ink composition of Example 26 is the same as the ink composition of Example 5 except that a different dye is employed.

| | |
|---|---|
| C.I. Direct Black 154 | 5% |
| glycerol | 7% |
| diethyleneglycol | 5% |
| organic silicon compound (A) | 5% |
| diammonium hydrogen phosphate | 5% |
| pure water | 73% |

EXAMPLE 27

The ink composition of Example 27 is the same as the ink composition of Example 5 except that a different dye is employed.

| | |
|---|---|
| C.I. Direct Yellow 132 | 5% |
| glycerol | 7% |
| diethyleneglycol | 5% |
| organic silicon compound (A) | 5% |
| diammonium hydrogen phosphate | 5% |
| pure water | 73% |

EXAMPLE 28

The ink composition of Example 28 is the same as the ink composition of Example 5 except that a different dye is employed.

| | |
|---|---|
| C.I. Direct Blue 199 | 5% |
| glycerol | 7% |
| diethyleneglycol | 5% |
| organic silicon compound (A) | 5% |
| diammonium hydrogen phosphate | 5% |
| pure water | 73% |

EXAMPLE 29

The ink composition of Example 29 is the same as the ink composition of Example 5 except that a pigment is employed in place of the dye.

| | |
|---|---|
| carbon black (product name: "CAB-U-JETTM-200"; produced by Cabot Co.) | 5% |
| glycerol | 7% |
| diethyleneglycol | 5% |
| organic silicon compound (A) | 5% |
| diammonium hydrogen phosphate | 5% |
| pure water | 73% |

EXAMPLE 30

The ink composition of Example 30 is the same as the ink composition of Example 5 except that a pigment is employed in place of the dye.

| | |
|---|---|
| carbon black (product name: "CAB-O-JETTM-300"; produced by Cabot Co.) | 5% |
| glycerol | 7% |
| diethyleneglycol | 5% |
| organic silicon compound (A) | 5% |
| diammonium hydrogen phosphate | 5% |
| pure water | 73% |

EXAMPLE 31

The ink composition of Example 31 is the same as the ink composition of Example 5 except that a pigment is employed in place of the dye.

| | |
|---|---|
| yellow pigment (product name: "FUJI SP YELLOW 4223"; produced by FUJI SHIKISO Co.) | 5% |
| glycerol | 7% |
| diethyleneglycol | 5% |
| organic silicon compound (A) | 5% |
| diammonium hydrogen phosphate | 5% |
| pure water | 73% |

EXAMPLE 32

The ink composition of Example 32 is the same as the ink composition of Example 5 except that a pigment is employed in place of the dye.

| | |
|---|---|
| magenta pigment (product name: "FUJI SP MAGENTA 9338"; produced by FUJI SHIKISO Co.) | 5% |
| glycerol | 7% |
| diethyleneglycol | 5% |
| organic silicon compound (A) | 5% |
| diammonium hydrogen phosphate | 5% |
| pure water | 73% |

EXAMPLE 33

The ink composition of Example 33 is the same as the ink composition of Example 5 except that a pigment is employed in place of the dye.

| | |
|---|---|
| cyan pigment (product name: "FUJI SP BLUE 6403 produced by FUJI SHIKISO Co.) | 5% |
| glycerol | 7% |
| diethyleneglycol | 5% |
| organic silicon compound (A) | 5% |
| diammonium hydrogen phosphate | 5% |
| pure water | 73% |

The ink compositions of Examples 34–66 contain a penetrant in addition to the constituents of the ink compositions of Examples 1–33, respectively. Each of the ink compositions of Examples 34–66 contains 5% of diethyleneglycol monobutylether as the penetrant.

(Example 34)

| | |
|---|---|
| C.I. Acid Red 289 | 5% |
| glycerol | 7% |
| diethyleneglycol | 5% |
| diethyleneglycol monobutylether | 5% |
| organic silicon compound (A) | 5% |
| ammonium chloride | 5% |
| pure water | 68% |

(Example 35)

| | |
|---|---|
| C.I. Acid Red 289 | 5% |
| glycerol | 7% |
| diethyleneglycol | 5% |
| diethyleneglycol monobutylether | 5% |
| organic silicon compound (A) | 5% |
| ammonium nitrate | 5% |
| pure water | 68% |

(Example 36)

| | |
|---|---|
| C.I. Acid Red 289 | 5% |
| glycerol | 7% |
| diethyleneglycol | 5% |
| diethyleneglycol monobutylether | 5% |
| organic silicon compound (A) | 5% |
| ammonium sulfate | 5% |
| pure water | 68% |

(Example 37)

| | |
|---|---|
| C.I. Acid Red 289 | 5% |
| glycerol | 7% |
| diethyleneglycol | 5% |
| diethyleneglycol monobutylether | 5% |
| organic silicon compound (A) | 5% |
| ammonium bromide | 5% |
| pure water | 68% |

(Example 38)

| | |
|---|---|
| C.I. Acid Red 289 | 5% |
| glycerol | 7% |
| diethyleneglycol | 5% |
| diethyleneglycol monobutylether | 5% |
| organic silicon compound (A) | 5% |
| diammonium hydrogen phosphate | 5% |
| pure water | 68% |

(Example 39)

| | |
|---|---|
| C.I. Acid Red 289 | 5% |
| glycerol | 7% |
| diethyleneglycol | 5% |
| diethyleneglycol monobutylether | 5% |
| organic silicon compound (A) | 5% |
| ammonium carbonate | 5% |
| pure water | 68% |

(Example 40)

| | |
|---|---|
| C.I. Acid Red 289 | 5% |
| glycerol | 7% |
| diethyleneglycol | 5% |
| diethyleneglycol monobutylether | 5% |
| organic silicon compound (A) | 5% |
| ammonium bicarbonate | 5% |
| pure water | 68% |

(Example 41)

| | |
|---|---|
| C.I. Acid Red 289 | 5% |
| glycerol | 7% |
| diethyleneglycol | 5% |
| diethyleneglycol monobutylether | 5% |
| organic silicon compound (A) | 5% |
| ammonium borate | 5% |
| pure water | 68% |

(Example 42)

| | |
|---|---|
| C.I. Acid Red 289 | 5% |
| glycerol | 7% |
| diethyleneglycol | 5% |
| diethyleneglycol monobutylether | 5% |
| organic silicon compound (A) | 5% |
| ammonium formate | 5% |
| pure water | 68% |

(Example 43)

| | |
|---|---|
| C.I. Acid Red 289 | 5% |
| glycerol | 7% |
| diethyleneglycol | 5% |
| diethyleneglycol monobutylether | 5% |
| organic silicon compound (A) | 5% |
| ammonium trifluoroacetate | 5% |
| pure water | 68% |

(Example 44)

| | |
|---|---|
| C.I. Acid Red 289 | 5% |
| glycerol | 7% |
| diethyleneglycol | 5% |
| diethyleneglycol monobutylether | 5% |
| organic silicon compound (A) | 5% |
| ammonium monochloroacetate | 5% |
| pure water | 68% |

(Example 45)

| | |
|---|---|
| C.I. Acid Red 289 | 5% |
| glycerol | 7% |
| diethyleneglycol | 5% |
| diethyleneglycol monobutylether | 5% |
| organic silicon compound (A) | 5% |
| ammonium trichloroacetate | 5% |
| pure water | 68% |

(Example 46)

| | |
|---|---|
| C.I. Acid Red 289 | 5% |
| glycerol | 7% |
| diethyleneglycol | 5% |
| diethyleneglycol monobutylether | 5% |
| organic silicon compound (A) | 5% |
| ammonium acetate | 5% |
| pure water | 68% |

(Example 47)

| | |
|---|---|
| C.I. Acid Red 289 | 5% |
| glycerol | 7% |
| diethyleneglycol | 5% |
| diethyleneglycol monobutylether | 5% |
| organic silicon compound (A) | 5% |
| diammonium oxalate | 5% |
| pure water | 68% |

(Example 48)

| | |
|---|---|
| C.I. Acid Red 289 | 5% |
| glycerol | 7% |
| diethyleneglycol | 5% |
| diethyleneglycol monobutylether | 5% |
| organic silicon compound (A) | 5% |

-continued

| | |
|---|---|
| diammonium citrate | 5% |
| pure water | 68% |

(Example 49)

| | |
|---|---|
| C.I. Acid Red 289 | 5% |
| glycerol | 7% |
| diethyleneglycol | 5% |
| diethyleneglycol monobutylether | 5% |
| organic silicon compound (A) | 5% |
| diammonium tartrate | 5% |
| pure water | 68% |

(Example 50)

| | |
|---|---|
| C.I. Acid Red 289 | 5% |
| glycerol | 7% |
| diethyleneglycol | 5% |
| diethyleneglycol monobutylether | 5% |
| organic silicon compound (A) | 5% |
| ammonium acetate | 2.5% |
| diammonium hydrogen phosphate | 2.5% |
| pure water | 68% |

(Example 51)

| | |
|---|---|
| C.I. Acid Red 289 | 5% |
| glycerol | 7% |
| diethyleneglycol | 5% |
| diethyleneglycol monobutylether | 5% |
| organic silicon compound (A) | 5% |
| ammonium acetate | 2.5% |
| ammonium nitrate | 2.5% |
| pure water | 68% |

(Example 52)

| | |
|---|---|
| C.I. Acid Red 289 | 5% |
| glycerol | 7% |
| diethyleneglycol | 5% |
| diethyleneglycol monobutylether | 5% |
| organic silicon compound (B) | 5% |
| diammonium hydrogen phosphate | 5% |
| pure water | 68% |

(Example 53)

| | |
|---|---|
| C.I. Acid Red 289 | 5% |
| glycerol | 7% |
| diethyleneglycol | 5% |
| diethyleneglycol monobutylether | 5% |
| organic silicon compound (B) | 5% |
| ammonium acetate | 5% |
| pure water | 68% |

(Example 54)

| | |
|---|---|
| C.I. Acid Red 289 | 5% |
| glycerol | 7% |
| diethyleneglycol | 5% |
| diethyleneglycol monobutylether | 5% |
| organic silicon compound (B) | 5% |
| diammonium hydrogen phosphate | 0.1% |
| pure water | 72.9% |

(Example 55)

| | |
|---|---|
| C.I. Acid Red 289 | 5% |
| glycerol | 7% |
| diethyleneglycol | 5% |
| diethyleneglycol monobutylether | 5% |
| organic silicon compound (B) | 5% |
| diammonium hydrogen phosphate | 0.5% |
| pure water | 72.5% |

(Example 56)

| | |
|---|---|
| C.I. Acid Red 289 | 5% |
| glycerol | 7% |
| diethyleneglycol | 5% |
| diethyleneglycol monobutylether | 5% |
| organic silicon compound (B) | 5% |
| diammonium hydrogen phosphate | 1% |
| pure water | 72% |

(Example 57)

| | |
|---|---|
| C.I. Acid Red 289 | 5% |
| glycerol | 7% |
| diethyleneglycol | 5% |
| diethyleneglycol monobutylether | 5% |
| organic silicon compound (B) | 5% |
| diammonium hydrogen phosphate | 2% |
| pure water | 71% |

(Example 58)

| | |
|---|---|
| C.I. Acid Red 289 | 5% |
| glycerol | 7% |
| diethyleneglycol | 5% |
| diethyleneglycol monobutylether | 5% |
| organic silicon compound (B) | 5% |
| diammonium hydrogen phosphate | 10% |
| pure water | 63% |

(Example 59)

| | |
|---|---|
| C.I. Direct Black 154 | 5% |
| glycerol | 7% |
| diethyleneglycol | 5% |
| diethyleneglycol monobutylether | 5% |
| organic silicon compound (A) | 5% |
| diammonium hydrogen phosphate | 5% |
| pure water | 68% |

(Example 60)

| | |
|---|---|
| C.I. Direct Yellow 132 | 5% |
| glycerol | 7% |
| diethyleneglycol | 5% |
| diethyleneglycol monobutylether | 5% |
| organic silicon compound (A) | 5% |
| diammonium hydrogen phosphate | 5% |
| pure water | 68% |

(Example 61)

| | |
|---|---|
| C.I. Direct Blue 199 | 5% |
| glycerol | 7% |
| diethyleneglycol | 5% |
| diethyleneglycol monobutylether | 5% |
| organic silicon compound (A) | 5% |
| diammonium hydrogen phosphate | 5% |
| pure water | 68% |

(Example 62)

| | |
|---|---|
| carbon black (product name: "CAB-O-JET™-200"; produced by Cabot Co.) | 5% |
| glycerol | 7% |
| diethyleneglycol | 5% |
| diethyleneglycol monobutylether | 5% |
| organic silicon compound (A) | 5% |
| diammonium hydrogen phosphate | 5% |
| pure water | 68% |

(Example 63)

| | |
|---|---|
| carbon black (product name: "CAB-O-JET™-300"; produced by Cabot Co.) | 5% |
| glycerol | 7% |
| diethyleneglycol | 5% |
| diethyleneglycol monobutylether | 5% |
| organic silicon compound (A) | 5% |
| diammonium hydrogen phosphate | 5% |
| pure water | 68% |

(Example 64)

| | |
|---|---|
| yellow pigment (product name: "FUJI SP YELLOW 4223"; produced by FUJI SHIKISO Co.) | 5% |
| glycerol | 7% |
| diethyleneglycol | 5% |
| diethyleneglycol monobutylether | 5% |
| organic silicon compound (A) | 5% |
| diammonium hydrogen phosphate | 5% |
| pure water | 68% |

-continued (Example 65)

| | |
|---|---|
| magenta pigment (product name: "FUJI SP MAGENTA 9338"; produced by FUJI SHIKISO Co.) | 5% |
| glycerol | 7% |
| diethyleneglycol | 5% |
| diethyleneglycol monobutylether | 5% |
| organic silicon compound (A) | 5% |
| diammonium hydrogen phosphate | 5% |
| pure water | 68% |

(Example 66)

| | |
|---|---|
| cyan pigment (product name: "FUJI SP BLUE 6403"; produced by FUJI SHIKISO Co.) | 5% |
| glycerol | 7% |
| diethyleneglycol | 5% |
| diethyleneglycol monobutylether | 5% |
| organic silicon compound (A) | 5% |
| diammonium hydrogen phosphate | 5% |
| pure water | 68% |

For comparison, 4 types of ink compositions which have the compositions shown below were prepared (Comparative Examples 1–4). (It should be noted that the contents of the constituents of each composition are shown in percentage by mass.) None of the ink compositions of Comparative Examples 1–4 contains a condensation-polymerization accelerating agent.

(Comparative Example 1)

| | |
|---|---|
| C.I. Acid Red 289 | 5% |
| glycerol | 7% |
| diethyleneglycol | 5% |
| organic silicon compound (A) | 5% |
| pure water | 78% |

(Comparative Example 2)

| | |
|---|---|
| C.I. Acid Red 289 | 5% |
| glycerol | 7% |
| diethyleneglycol | 5% |
| diethyleneglycol monobutylether | 5% |
| organic silicon compound (A) | 5% |
| pure water | 73% |

(Comparative Example 3)

| | |
|---|---|
| C.I. Acid Red 289 | 5% |
| glycerol | 7% |
| diethyleneglycol | 5% |
| organic silicon compound (B) | 5% |
| pure water | 78% |

(Comparative Example 4)

| | |
|---|---|
| C.I. Acid Red 289 | 5% |
| glycerol | 7% |
| diethyleneglycol | 5% |
| diethyleneglycol monobutylether | 5% |
| organic silicon compound (B) | 5% |
| pure water | 73% |

Table 1 shows the results of the water-resistivity test performed on the ink compositions of Examples 1–33 together with the pH values of the ink compositions. Table 2 shows the results of the water-resistivity test performed on the ink compositions of Examples 34–66 together with the pH values of the ink compositions. Table 3 shows the results of the water-resistivity test performed on the ink compositions of Comparative Examples 1–4 together with the pH values of the ink compositions.

Evaluation of the water-resistivity is represented by the ratio (%) of the OD value of a printed character sample which was measured after the water-resistivity test to the OD value of the printed character sample which was measured before the water-resistivity test.

Printed character samples used for this water-resistivity test were formed by solid printing on plain paper (product name: "Xerox4024"; produced by Xerox Co.) with the recording apparatus A loaded with each of the above ink compositions such that each sample has a size of 15 mm×15 mm square. The water-resistivity test was performed in such a manner that the paper having the printed character samples formed thereon was soaked in distilled water for 5 minutes with the printed side down. After being soaked, the paper was dried in air for 30 minutes, and then, the OD value of each sample was measured.

TABLE 1

| | Water-resistivity (%) | pH |
|---|---|---|
| Example 1 | 91 | 8.8 |
| Example 2 | 92 | 8.7 |
| Example 3 | 91 | 9.0 |
| Example 4 | 91 | 8.8 |
| Example 5 | 96 | 8.9 |
| Example 6 | 90 | 9.1 |
| Example 7 | 91 | 8.4 |
| Example 8 | 91 | 9.5 |
| Example 9 | 97 | 9.5 |
| Example 10 | 96 | 9.0 |
| Example 11 | 96 | 9.3 |
| Example 12 | 96 | 9.2 |
| Example 13 | 97 | 9.8 |
| Example 14 | 91 | 9.6 |
| Example 15 | 91 | 9.5 |
| Example 16 | 92 | 9.2 |
| Example 17 | 97 | 8.8 |
| Example 18 | 97 | 8.7 |
| Example 19 | 96 | 8.7 |
| Example 20 | 97 | 9.8 |
| Example 21 | 96 | 8.9 |
| Example 22 | 96 | 8.9 |
| Example 23 | 96 | 8.8 |
| Example 24 | 96 | 8.8 |
| Example 25 | 96 | 8.5 |
| Example 26 | 98 | 8.9 |
| Example 27 | 99 | 8.9 |
| Example 28 | 99 | 8.9 |
| Example 29 | 97 | 8.9 |
| Example 30 | 97 | 8.9 |
| Example 31 | 97 | 8.9 |
| Example 32 | 97 | 8.9 |
| Example 33 | 97 | 8.9 |

TABLE 2

| | Water-resistivity (%) | pH |
|---|---|---|
| Example 34 | 92 | 8.8 |
| Example 35 | 93 | 8.7 |
| Example 36 | 92 | 9.0 |
| Example 37 | 92 | 8.8 |
| Example 38 | 97 | 8.9 |
| Example 39 | 90 | 9.1 |
| Example 40 | 92 | 8.4 |
| Example 41 | 92 | 9.5 |
| Example 42 | 98 | 9.5 |
| Example 43 | 97 | 9.0 |
| Example 44 | 97 | 9.3 |
| Example 45 | 97 | 9.2 |
| Example 46 | 98 | 9.8 |
| Example 47 | 92 | 9.6 |
| Example 48 | 92 | 9.5 |
| Example 49 | 93 | 9.2 |
| Example 50 | 98 | 8.8 |
| Example 51 | 98 | 8.7 |
| Example 52 | 97 | 8.7 |

TABLE 2-continued

|  | Water-resistivity (%) | pH |
| --- | --- | --- |
| Example 53 | 98 | 9.8 |
| Example 54 | 97 | 8.9 |
| Example 55 | 97 | 8.9 |
| Example 56 | 97 | 8.8 |
| Example 57 | 97 | 8.8 |
| Example 58 | 97 | 8.5 |
| Example 59 | 99 | 8.9 |
| Example 60 | 100 | 8.9 |
| Example 61 | 100 | 8.9 |
| Example 62 | 99 | 8.9 |
| Example 63 | 99 | 8.9 |
| Example 64 | 99 | 8.9 |
| Example 65 | 99 | 8.9 |
| Example 66 | 99 | 8.9 |

TABLE 3

|  | Water-resistivity (%) | pH |
| --- | --- | --- |
| Comparative Example 1 | 81 | 10.8 |
| Comparative Example 2 | 83 | 10.8 |
| Comparative Example 3 | 81 | 10.8 |
| Comparative Example 4 | 83 | 10.8 |

As seen from Tables 1–3, all of the ink compositions of Examples 1–66 have the water-resistivity of 90% or higher. The ink compositions containing a strong-acid ammonium salt have the pH value of 9.0 or smaller.

On the other hand, the ink compositions of Comparative Examples 1–4 have the water-resistivity of 90% or lower but have a high pH value of 10 or greater.

Then, images were formed using the ink compositions of Examples 1–66 and Comparative Examples 1–4 with a commercially-available printer (product name "EM-930C"; produced by SEIKO EPSON Co.) on plain paper (product name: "Xerox4024"; produced by Xerox Co.). The paper was soaked into water immediately after the images were formed. After being soaked, the paper was left in a room temperature environment for drying, and it was examined whether or not a bleeding occurs in the images.

As a result, in the images formed with the ink compositions of Comparative Examples 1–4, a bleeding was found in an edge portion of each image. On the other hand, in the images formed with the ink compositions of Examples 1–66, a bleeding was scarcely found. Thus, it is appreciated that an ink composition containing a colorant, a humectant, water, a water-soluble substance that is condensation-polymerized as the water evaporates, and a condensation-polymerization accelerating agent greatly improves the water-resistivity of a printed image.

What is claimed is:

1. An ink composition used for inkjet recording, comprising: a colorant; a humectant; water; a water-soluble substance that begins to be condensation-polymerized as the water evaporates; and a condensation-polymerization accelerating agent for accelerating the condensation-polymerization of the water-soluble substance.

2. An ink composition according to claim 1, wherein the water-soluble substance is a hydrolyzable silane compound.

3. An ink composition according to claim 1, wherein the condensation-polymerization accelerating agent is an inorganic or organic ammonium salt.

4. An ink composition according to claim 3, wherein the ammonium salt is a weak-acid salt.

5. An ink composition according to claim 3, wherein the ammonium salt is a strong-acid salt.

6. An ink composition according to claim 1, further comprising a penetrant.

7. An ink composition used for inkjet recording comprising:

a colorant; a humectant; water; a water-soluble substance that begins to be condensation-polymerized as the water evaporates; and a condensation-polymerization accelerating agent for accelerating the condensation-polymerization of the water-soluble substance, wherein the condensation-polymerization accelerating agent is selected from the group consisting of ammonium chloride, ammonium sulfate, ammonium hydrogensulfate, ammonium sulfite, ammonium thiosulfate, ammonium nitrate, ammonium bromide, ammonium fluoride, and ammonium iodide.

8. An ink composition used for inkjet recording comprising:

a colorant; a humectant; water; a water-soluble substance that begins to be condensation-polymerized as the water evaporates; and a condensation-polymerization accelerating agent for accelerating the condensation-polymerization of the water-soluble substance, wherein the condensation-polymerization accelerating agent is selected from the group consisting of monoammonium dihydrogen phosphate, diammonium hydrogen phosphate, triammonium phosphate, ammonium hypophosphite, ammonium bicarbonate, ammonium sulfide, ammonium borate, and ammonium borofluoride.

9. An ink composition used for inkjet recording comprising:

a colorant; a humectant; water; a water-soluble substance that begins to be condensation-polymerized as the water evaporates; and a condensation-polymerization accelerating agent for accelerating the condensation-polymerization of the water-soluble substance, wherein the condensation-polymerization accelerating agent is selected from the group consisting of ammonium formate, ammonium monofluoroacetate, ammonium trifluoroacetate, ammonium monochloracetate, and ammonium trichloracetate.

10. An ink composition used for inkjet recording comprising:

a colorant; a humectant; water; a water-soluble substance that begins to be condensation-polymerized as the water evaporates; and a condensation-polymerization accelerating agent for accelerating the condensation-polymerization of the water-soluble substance, wherein the condensation-polymerization accelerating agent is selected from the group consisting of ammonium acetate, diammonium oxalate, ammonium hydrogen oxalate, ammonium benzoate, monoammonium citrate, diammonium citrate, triammonium citrate, ammonium lactate, ammonium phthalate, ammonium succinate, monoammonium tartrate, and diammonium tartrate.

* * * * *